Figure 1:
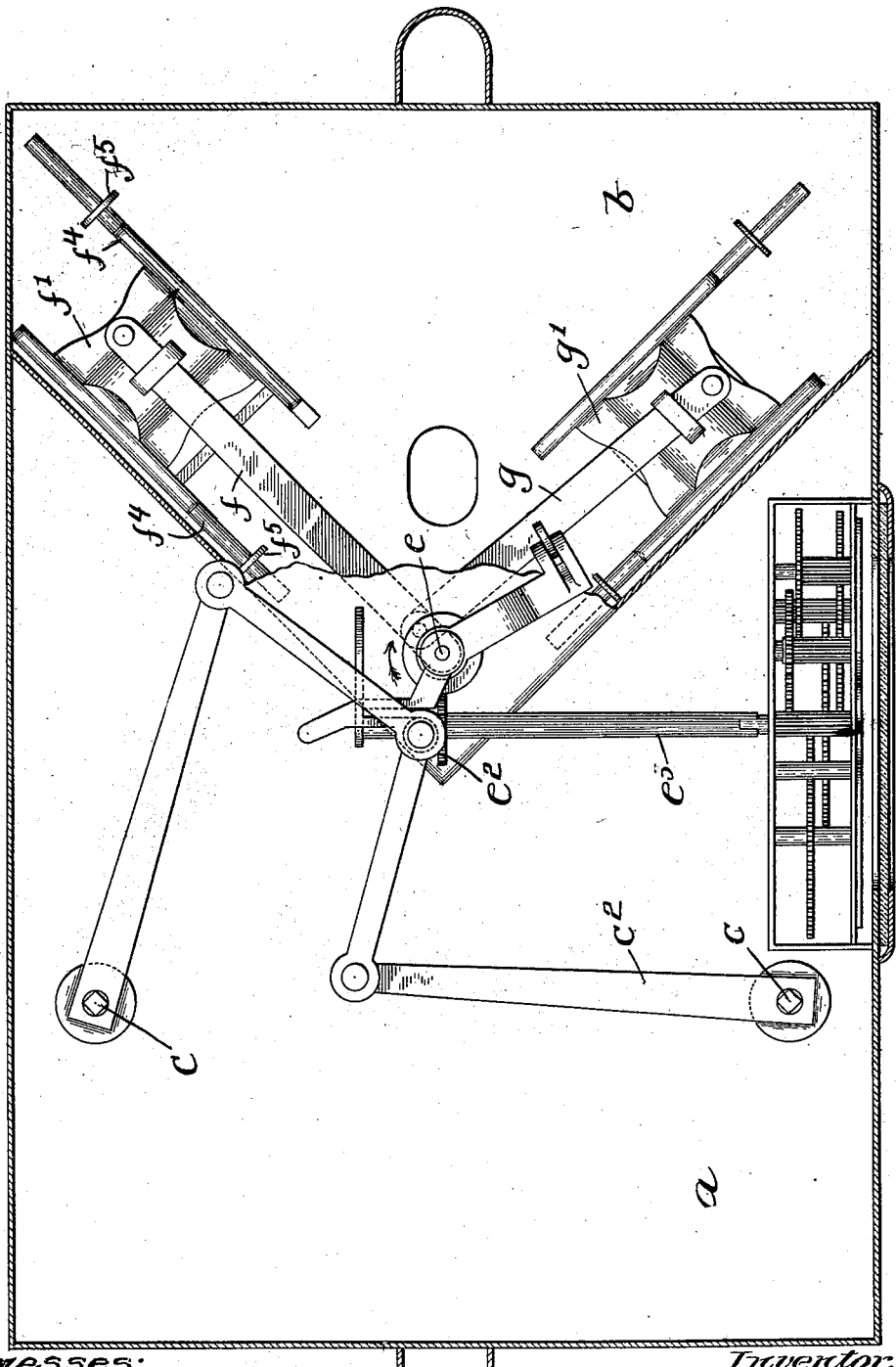

No. 687,429. Patented Nov. 26, 1901.
C. W. HINMAN.
GAS METER.
(Application filed Oct. 26, 1900.)

(No Model.) 3 Sheets—Sheet 1.

Witnesses:
Arthur F. Randall
H. B. Davis

Inventor:
Charles W. Hinman
by B. J. Hayes,
Atty

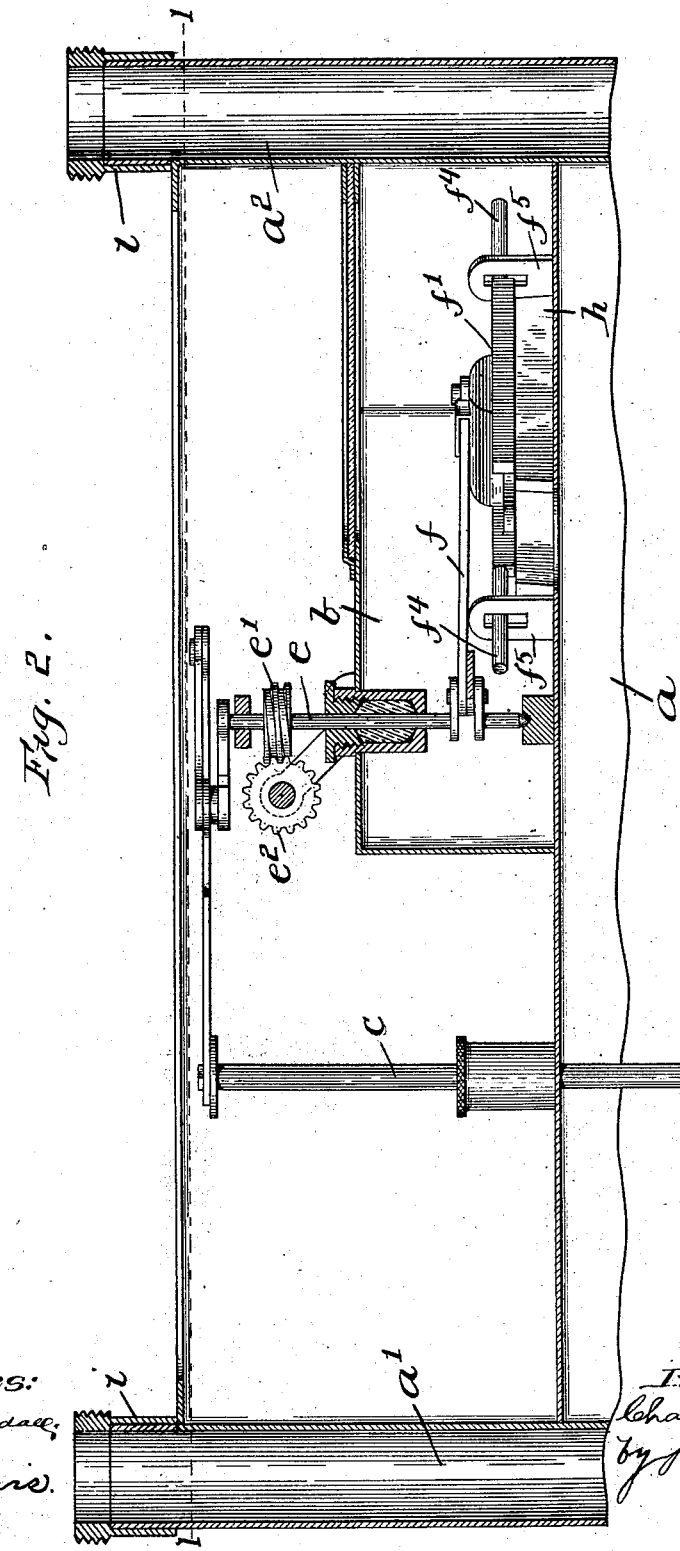

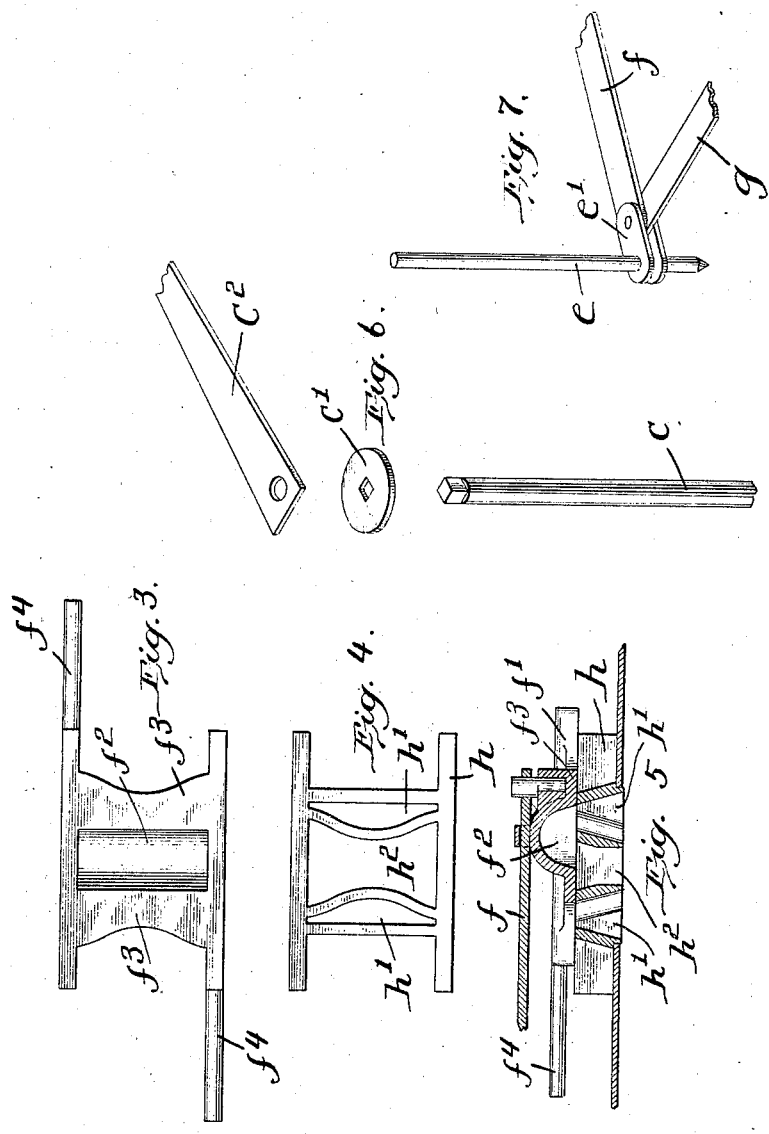

UNITED STATES PATENT OFFICE.

CHARLES W. HINMAN, OF BOSTON, MASSACHUSETTS.

GAS-METER.

SPECIFICATION forming part of Letters Patent No. 687,429, dated November 26, 1901.

Application filed October 26, 1900. Serial No. 34,422. (No model.)

*To all whom it may concern:*

Be it known that I, CHARLES W. HINMAN, of Boston, county of Suffolk, State of Massachusetts, have invented an Improvement in Gas-Meters, of which the following description, in connection with the accompanying drawings, is a specification, like letters on the drawings representing like parts.

In ordinary gas-meters, commonly known as "dry" meters, two oscillating diaphragm-rods are connected by crank arms and links to a crank-arm secured to a rotatable shaft, and two slide-valves are connected by links to another crank-arm secured to said rotatable shaft, which control the ports leading to and from the diaphragm-chambers, and as said shaft is rotated by the action of the diaphragms the said slide-valves are operated alternately. For simplicity of construction a crank is employed for operating the slide-valves, and the ports are all made rectangular, and by reason of the inherent construction of the crank and the shape of the ports the openings of said ports increase and decrease at a constant ratio relative to the movement of the valve, and as a result the sum of the openings of the ports of the two valves leading to the diaphragm-chambers is not constant, nor is the sum of the openings of the ports of the two valves leading from said chambers.

This invention has for its object to improve the construction of a gas-meter to the end that a crank may be employed as the actuator for the slide-valves, and the sum of the openings of the ports leading to the diaphragm-chambers is always constant and also the sum of the openings of the ports leading from said chambers. In carrying out this part of my invention a rotatable crank is employed, and two slide-valves are connected therewith by links, so as to be moved alternately as said shaft rotates, and inlet and exhaust ports are provided for the diaphragm-chambers, which are controlled by said slide-valves, and said inlet and exhaust ports and also the valves are so constructed and arranged that the openings of the ports will vary at a progressive ratio relative to the movement of the valves instead of at a constant ratio relative to the movement of the valves, and as a result the sum of the openings of the ports of the two valves is maintained constant at all times.

The invention also has for its object to improve the construction of the means for attaching the crank-arms to the diaphragm-rods, whereby the cost of construction is reduced and a very reliable and positive connection insured. In carrying out this part of my invention the upper end of the diaphragm-rod is squared or made of other than round shape, and a disk or plate having a hole through it corresponding to the shape of the end of the rod is fitted onto the rod, and a crank-arm having a hole through it which receives the upper end of the rod is placed upon and soldered or otherwise secured to said disk or plate.

The invention also has for its object to improve the construction of the nipples applied to the upper ends of the inlet and outlet tubes, whereby the cost of production is reduced and the solder employed for attaching said nipples to the tubes may be effectually prevented from entering the screw-threads. In carrying out this part of my invention a nipple is made with a screw-threaded end portion and a tubular body adapted to snugly fit upon the outside of the tube to which it is to be applied, and such a nipple may be easily and cheaply manufactured, as the shoulder against which the upper end of the tube abuts is formed on the inside of the nipple.

Heretofore the slide-valves have been provided with guide-rods at opposite ends which crossed the inlet-ports and thereby obstructed said ports more or less; and this invention also has for its object to provide means for guiding and supporting said slide-valves in such manner that the inlet-ports are fully exposed. To this end the slide-valve is formed or provided upon each side with a guide-rod, and said guide-rods project in opposite ways.

Figure 1 shows a top view of a gas-meter embodying this invention, the top plate of the meter being removed and a portion of the top plate of the chamber containing the valves being broken away. Fig. 2 is a vertical section of the upper part of the meter shown in Fig. 1, taken on the dotted line 1 1. Fig. 3 is an under side view of one of the slide-valves. Fig. 4 is a plan view of the plate in which the inlet and exhaust ports are formed.

Fig. 5 is a vertical section of the slide-valve and the plate having the ports. Fig. 6 is a view showing the diaphragm-rod, disk or plate thereon, and crank-arm. Fig. 7 is a view of the rotatable shaft which serves as the actuator for the slide-valves and the links connected thereto.

$a$ represents the usual box-like compartment; $a'$, the inlet-tube; $a^2$, the outlet-tube; $b$, the chamber containing the slide-valves; $c\ c$, the rods connected to the usual diaphragms, (not shown;) $e$, the rotatable shaft having thereon a worm $e'$, engaging a pinion $e^2$, secured to a shaft $e^3$, connected with the indicating mechanism. The rotatable shaft $e$ has connected with it a crank-arm to which the links $f\ g$ are loosely connected, said links being also loosely connected to the slide-valves $f'\ g'$. The slide-valves $f'\ g'$ are made alike, or substantially so, and one only will be described. The slide-valve $f'$ consists of a plate having a flat-surfaced bottom and provided with a rectangular recess $f^2$ between its ends, and at each side of said recess $f^2$ the flat-surfaced portions $f^3$ serve as the laps for the ports. The outer edges of the laps are curved for purposes to be described. The plate $f'$ is provided on each side with a guide-rod $f^4$, which project in opposite ways and which pass through holes formed in ears $f^5$. These guide-rods being located at the sides of the plate do not cross, and thereby obstruct, the inlet-ports.

$h$ represents a plate formed with a flat-surfaced top on which the slide-valve $f$ is free to slide with a tight fit, and said plate is formed with two inlet-ports $h'\ h'$ and an exhaust-port $h^2$. The inlet-ports $h'$ are made substantially alike, but disposed in opposite ways, and, as herein shown, each inlet-port has one straight and one curved side, and the exhaust-port $h^2$ is formed or provided with two curved sides, the curvatures of which are opposite the curvature of the curved side of the inlet-port. By thus shaping the inlet and exhaust ports and the laps of the slide-valve it will be seen that as the valve is moved back and forth the openings of the ports will increase at a progressive ratio relative to the movement of the valve as contrasted to increasing at a constant ratio, as heretofore. As a result the sum of the openings of the inlet-ports of the two valves will be constant at all times, and also the sum of the openings of the exhaust-ports of the two valves will be constant at all times.

The shaft $e$ is made of a single rod having secured to it two elongated plates or arms $e'$ at a desirable point, which are disposed in parallelism, and then the material of the rod between said plates or arms is cut away, leaving a portion above and a portion below the plates or arms disposed in correct alinement.

The diaphragm-rod $c$ is made with a squared end or an end other than round, and a disk or plate $c'$, having a hole through it of a shape corresponding to the end of the rod, is fitted onto the end of said rod, and a crank-arm $c^2$, having a hole through it, is placed on said rod, upon the disk or plate $c'$, and is soldered to said disk or plate.

The nipples $i$, which are secured to the tops of the inlet and outlet tubes, are herein shown as formed with screw-threaded ends and tubular bodies, adapted to fit snugly upon the outside of the tops of the tubes, and with an internal shoulder against which the tops of the tubes abut. The said nipples are soldered to the tops of the tubes.

I claim—

1. In a gas-meter, a rotatable crank, two slide-valves connected therewith by links to be moved alternately as said shaft rotates, inlet and exhaust ports controlled by said slide-valves, said valves and ports being constructed and arranged substantially as described, whereby the openings of said ports will vary at a progressive ratio relative to the movement of the valve and consequently the sum of the openings of the ports of the two valves maintained constant at all times, substantially as described.

2. In a gas-meter, a diaphragm-rod having a squared or other than round end, a disk or plate having a hole through it corresponding to the shape of the end of the rod which is fitted onto said rod, and a crank-arm having a hole through it which receives the upper end of the rod and which is placed upon and soldered to said disk or plate, substantially as described.

3. In a gas-meter, a nipple adapted to be soldered to the inlet and outlet tubes having a screw-threaded end portion, a tubular body adapted to fit upon the outside of the tube to which it is applied, and an internal shoulder abutting against the upper end of the tube, substantially as described.

4. In a gas-meter, slide-valves controlling the inlet and exhaust ports having guide-rods at each side which do not cross the inlet-ports and which project in opposite ways, substantially as described.

In testimony whereof I have signed my name to this specification in the presence of two subscribing witnesses.

CHARLES W. HINMAN.

Witnesses:
 B. J. NOYES,
 H. B. DAVIS.